(12) United States Patent
Cardell et al.

(10) Patent No.: US 9,073,636 B2
(45) Date of Patent: Jul. 7, 2015

(54) ROTOR DAMPER AND TAIL ROTOR WITH SUCH A ROTOR DAMPER

(75) Inventors: Per-Erik Cardell, Linköping (SE); Tommy Johansson, Mjölby (SE); Johan Lindroth, Sturefors (SE); Kjell Stenbom, Norrköping (SE)

(73) Assignee: SAAB AB, Linköping (SE)

( * ) Notice: Subject to any disclaimer, the term of this patent is extended or adjusted under 35 U.S.C. 154(b) by 780 days.

(21) Appl. No.: 13/375,964

(22) PCT Filed: Jun. 2, 2009

(86) PCT No.: PCT/SE2009/050645
§ 371 (c)(1),
(2), (4) Date: Feb. 29, 2012

(87) PCT Pub. No.: WO2010/140933
PCT Pub. Date: Dec. 9, 2010

(65) Prior Publication Data
US 2012/0148409 A1    Jun. 14, 2012

(51) Int. Cl.
*B64C 27/82* (2006.01)
*B64C 27/51* (2006.01)
*B64C 27/00* (2006.01)

(52) U.S. Cl.
CPC ........... *B64C 27/82* (2013.01); *B64C 2027/003* (2013.01); *Y10S 416/50* (2013.01); *B64C 27/51* (2013.01)

(58) Field of Classification Search
CPC ...... B64C 27/51; B64C 27/43; B64C 27/001; B64C 2027/001; B64C 2201/024; B64C 27/82; B64C 27/003; Y10S 416/50
USPC ........... 416/146 R, 140, 167, 500, 134 A, 106
See application file for complete search history.

(56) References Cited

U.S. PATENT DOCUMENTS

| | | | | |
|---|---|---|---|---|
| 2,164,485 | A * | 7/1939 | Yantis | 464/37 |
| 2,235,605 | A * | 3/1941 | Bugatti | 416/134 R |
| 2,312,822 | A * | 3/1943 | Julien et al. | 416/131 |
| 2,556,151 | A * | 6/1951 | Bremer | 403/356 |

(Continued)

FOREIGN PATENT DOCUMENTS

| | | |
|---|---|---|
| EP | 0327672 A2 | 8/1989 |
| EP | 1238906 A1 | 9/2002 |

(Continued)

OTHER PUBLICATIONS

PCT/ISA/210—International Search Report—Feb. 12, 2010.

(Continued)

*Primary Examiner* — Nathaniel Wiehe
*Assistant Examiner* — Wayne A Lambert
(74) *Attorney, Agent, or Firm* — Venable LLP; Eric J. Franklin

(57) ABSTRACT

A rotor damper for a tail rotor of a helicopter. A main body of a resilient material is to be arranged between a drive shaft for the tail rotor and a hub on which rotor blades for the tail rotor are coupled. A flange is connected to the main body of the rotor damper. The flange includes an abutment surface for abutting an outer surface of the hub. A tail rotor including the rotor damper.

14 Claims, 3 Drawing Sheets

(56) References Cited

U.S. PATENT DOCUMENTS

| | | | |
|---|---|---|---|
| 3,045,763 A * | 7/1962 | Perrott | 464/32 |
| 3,084,963 A * | 4/1963 | Beehler | 403/226 |
| 3,256,939 A * | 6/1966 | Novak | 416/135 |
| 3,477,794 A * | 11/1969 | Abbott et al. | 416/134 R |
| 3,575,530 A * | 4/1971 | Hall | 416/131 |
| 3,594,892 A * | 7/1971 | Stewart | 29/451 |
| 3,701,611 A * | 10/1972 | Lambrecht | 416/134 R |
| 3,999,887 A | 12/1976 | McGuire | |
| 4,008,980 A * | 2/1977 | Noehren et al. | 416/134 A |
| 4,053,258 A * | 10/1977 | Mouille | 416/134 A |
| 4,104,003 A * | 8/1978 | Mouille | 416/141 |
| 4,381,902 A | 5/1983 | Head et al. | |
| 4,382,566 A | 5/1983 | Brand | |
| 4,452,591 A * | 6/1984 | Fishbaugh et al. | 464/89 |
| 4,522,563 A * | 6/1985 | Reyes et al. | 416/134 A |
| 4,566,855 A * | 1/1986 | Costabile et al. | 416/134 R |
| 4,595,337 A * | 6/1986 | Crowe | 416/131 |
| 4,642,057 A * | 2/1987 | Frazzell et al. | 440/52 |
| 5,340,279 A * | 8/1994 | Cycon et al. | 416/134 A |
| 5,667,311 A * | 9/1997 | Maers | 384/441 |
| 6,085,384 A * | 7/2000 | Bivens | 16/54 |
| 6,471,481 B2 * | 10/2002 | Chen | 416/134 R |
| 7,223,073 B2 * | 5/2007 | Dean | 416/134 R |
| 2007/0177978 A1 | 8/2007 | Bi | |
| 2009/0016896 A1 * | 1/2009 | Hill | 416/244 R |

FOREIGN PATENT DOCUMENTS

| | | |
|---|---|---|
| EP | 2184229 A1 | 5/2010 |
| FR | 2317166 A1 | 2/1977 |
| GB | 478676 A | 1/1938 |
| GB | 2002308 A | 2/1979 |
| WO | WO-02079647 A1 | 10/2002 |
| WO | WO-2008153751 A2 | 12/2008 |

OTHER PUBLICATIONS

PCT/ISA/237—Written Opinion of the International Searching Authority—Feb. 12, 2010.
Supplementary European Search Report—Mar. 23, 2015 (Issued in Counterpart Application No. EP 09845603.1).

* cited by examiner

ROTOR DAMPER AND TAIL ROTOR WITH SUCH A ROTOR DAMPER

TECHNICAL FIELD

Cross-Reference to Related Applications

The present invention relates to a rotor damper for tail rotors of helicopters and a tail rotor provided with such a rotor damper.

BACKGROUND ART

A common type of helicopter is provided with a main rotor and a tail rotor. The main rotor supplies the primary forces for flight of the helicopter and the tail rotor provides stability and influence on the flight direction of the helicopter. The tail rotor of the helicopter is sensitive for wind disturbances which affects the manoeuvrability of the helicopter. These wind disturbances also creates undesirable vibrations which may be transmitted to the fuselage of the helicopter. Also, oscillations of the tail rotor blades are a primary source of undesirable vibrations. Such oscillations may occur from the so-called "scissors mode" motions of the rotor blades in relation to each others. In this mode the blades oscillates relative to the drive shaft and to each others in the plane of rotation of the rotor blades. The oscillations and vibrations generated by the tail rotor are undesirable because they increase the mechanical stress of the components in the helicopter.

Document U.S. Pat. No. 3,999,887 discloses a connecting assembly for the tail rotor of a helicopter. The assembly is provided with flexible straps which interconnect the rotor blades with the connecting assembly. The connecting assembly is also provided with layers of a viscoelastic material which are disposed normal to the axis of rotation of the drive shaft. By proper selection of the viscoelastic material for the layers oscillations and vibrations can be reduced through the damping characteristics of the viscoelastic material. The layers of viscoelastic material are bound to support or cover plates in the connecting assembly. Bolts and nuts lock the cover plates in a fixed position relative to the drive shaft.

The objective problem to be solved by the present invention is to increase the manoeuvrability of a helicopter.

Another objective problem to be solved by the present invention is to achieve a rotor damper which effectively dampens oscillations and vibrations of a tail rotor of a helicopter.

A further objective problem to be solved by the present invention is to achieve a rotor damper which is easy to replace and which can be replaced in a short period of time.

A still further objective problem to be solved by the present invention is to easy and in a short period of time change the damping characteristics of a rotor damper.

A still further objective problem to be solved by the present invention is to achieve a rotor damper for a tail rotor, which is adapted to an unattended helicopter.

SUMMARY OF THE INVENTION

The above-mentioned objects are achieved by a rotor damper and a tail rotor.

Such a rotor damper effectively dampens oscillations and vibrations of a tail rotor of a helicopter. The resilient material in the main body and the flange of the rotor damper will dampen the oscillations and vibrations which emanate from the rotor blades and prevent the oscillations and vibrations from propagate to the drive shaft and further to the helicopter.

The resilient connection between the hub and the drive shaft also increase the manoeuvrability of the helicopter. When changing the pitch of the rotor blades in order to change the direction of the helicopter the rotor damper prevents jerks and high acceleration forces which may occur in connection with a quick changing in the pitch.

According to an embodiment of the invention two slits are arranged in the main body, which slits extends in the direction of the length axis. The slits in the main body of the rotor damper thus make it possible for the rotor damper to slide into the intended position in the hub and onto the end part of the drive shaft. The slits also make it possible to replace the rotor damper with another rotor damper having different damping characteristics. According to the embodiment the rotor damper is fixated to the drive shaft and in the first bore of the hub by a treaded bolt which is threaded into a threaded hole in an end surface of the free end part of the drive shaft. This makes it easy and in a short period of time change the damping characteristics of a rotor damper.

According to an embodiment of the invention a support washer is arranged at an outer surface of the flange of the rotor damper and fixated by the treaded bolt. At least one distance washer is arranged between the support washer and the outer surface of the flange. The effect is that the required dampening characteristics of the tail rotor can be adjusted by adding or removing one or more distance washers.

According to an embodiment of the invention the helicopter is an unattended vehicle (UAV). Such unattended helicopters have smaller dimensions in relation to full size helicopters and therefore also the stresses on the components in the helicopter, such as the drive shafts, couplings, dampers and rotors, are smaller in an UAV in relation to a full size helicopter.

BRIEF DESCRIPTION OF THE DRAWINGS

Further advantages and features of the invention can be derived from the following detailed description of exemplary embodiments of the invention, with reference to the drawings.

DETAILED DESCRIPTION

Figure 1:
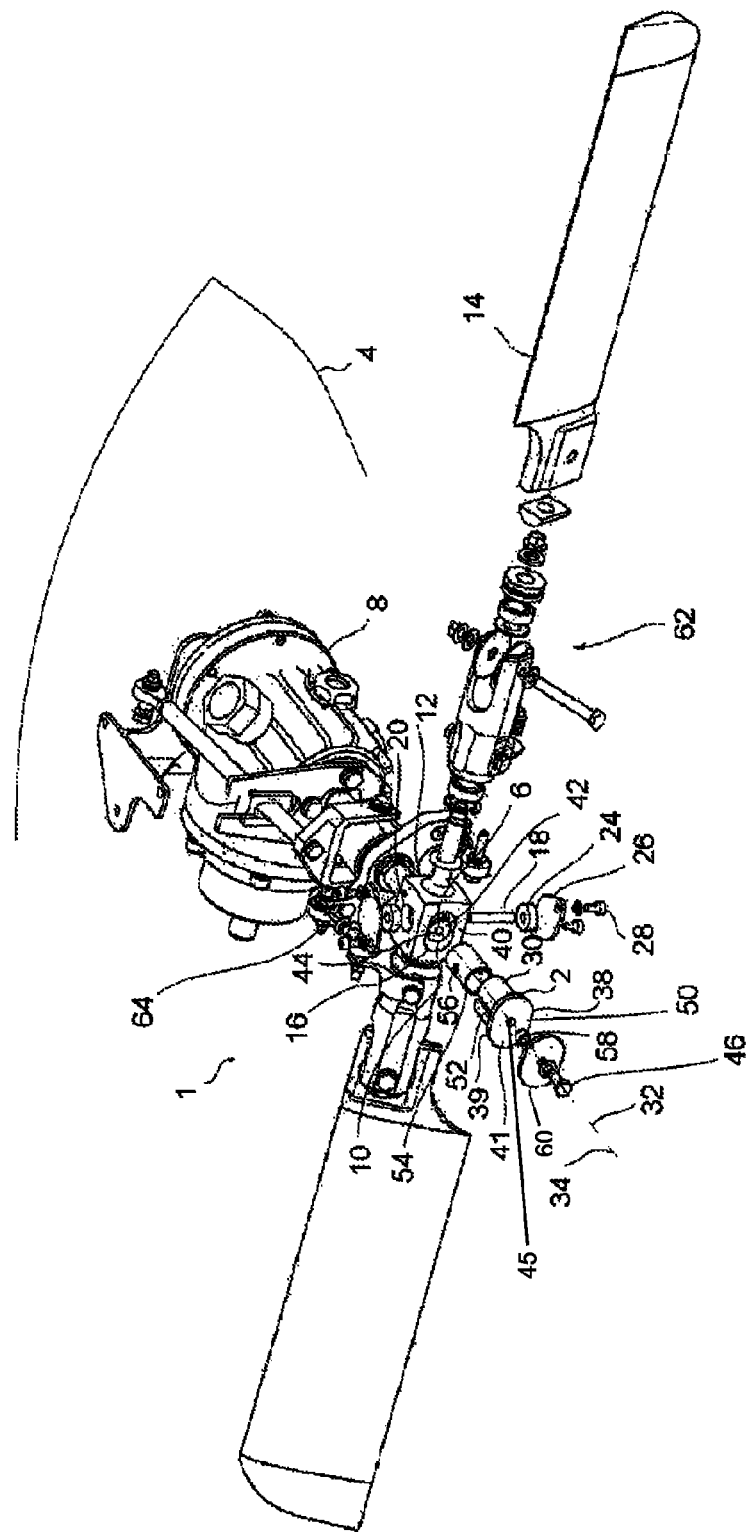
FIG. 1 shows an exploded view in perspective of a tail rotor provided with a rotor damper according to the invention.

FIG. 1 shows an exploded view in perspective of a tail rotor 1 provided with a rotor damper 2 according to the invention. The tail rotor 1 is arranged on the tail of a helicopter 4, which is only schematically disclosed in FIG. 1. The tail rotor 1 comprises a drive shaft 6, which is rotatable arranged in a gearbox 8. At the free end part 10 of the drive shaft 6 a hub 12 is arranged. Two rotor blades 14 are connected to the hub 12 via a linkage 62, so that the pitch of the blades 14 can be changed during flight of the helicopter 4 in order to manoeuvre the helicopter 4.

The hub 12 is provided with a first bore 16, which extends through the entire hub 12. The dimensions of the first bore 16 is adapted to accommodate the free end part 10 of drive shaft 6 and the hub 12 is connected to the drive shaft 6 in the rotational direction by a pin 18, which extends through a second bore 20 in the hub 12 and trough a substantially diametrically arranged hole 22 in the drive shaft 6. The pin 18 is pivotal arranged in the second bore 20 of the hub 12 via bearings 24, such as ball bearings. The pin 18 and the bearings 24 are locked in the axial direction of the pin 18 by means of lock plates 26 fixed by screws 28 into the hub 12. When the drive shaft 6 is driven by a motor (not disclosed) of the helicopter 4 the torque from the drive shaft 6 will be transferred to the hub 12 via the pin 18.

The rotor damper 2 is made of an elastic material and is arranged in the first bore 16 in the space between the hub 12 and the drive shaft 6. In order to accommodate the rotor damper 2 the dimensions of the first bore 16 is larger than the dimensions of the drive shaft 6. In the embodiment disclosed in FIG. 1 the free end part 10 of the drive shaft 6 is substantially circular and the first bore 16 is elongated in a direction which substantially coincides with an axis which extends through the rotor blades 14.

The outer dimensions of the rotor damper 2 substantially correspond to the inner dimensions of the first bore 16. Therefore, in the embodiment disclosed in FIG. 1 the rotor damper 2 has a main body 30 which is elongated in a direction perpendicular to is length axis 32. When elongated in a direction perpendicular to is length axis 32 and mounted in the first bore 16 so that the elongated part of the main body 30 substantially coincides with an axis which extends through both rotor blades 14 an effective vibration and dampening effect is achieved when the rotor blades 14 move or vibrate in a direction perpendicular to the rotation plane of the rotor blades 14. The main body 30 then has the possibility to be compressed within the first bore 16 of the hub 12. The length axis 32 of the rotor damper 2 substantially coincides with centre axis 34 of the drive shaft 6. The main body 30 of the rotor damper 2 is provided with a cylindrical cavity 36 in order to accommodate the free end part 10 of the drive shaft 6. The cylindrical cavity 36 has a centre axis which substantially coincides with the length axis 32 of the main body 30 of the rotor damper 2. The rotor damper 2 is also provided with a flange 38 connected to the main body 30. Preferably the flange 38 is made of the same material as the main body 30 of the rotor damper 2. The flange 38 is provided with an abutment surface 39 for abutting an outer surface 40 of the hub 12. When mounted in the first bore 16 of the hub 12 and connected to the drive shaft 6 the abutment surface 39 of the flange 38 of the rotor damper 2 will abut the outer surface 40 of the hub 12. The main body 30 also has an end portion 41 provided with an abutment surface 43 for abutting the distal end 42 of the drive shaft 6 of the tail rotor 1, which abutment surface 43 is substantially parallel to the abutment surface 39 of the flange 38. The abutment surfaces 39, 43 of the flange 38 and the end portion 41 have a common plane. The distal end 42 of the drive shaft 6 is provided with a threaded hole 44 having a centre axis which substantially coincides with the centre axis 34 of the drive shaft 6. A threaded bolt 46 fixates the rotor damper 2 to the drive shaft 6 and in the first bore 16 of the hub 12 when threaded into the threaded hole 44 in the drive shaft 6. Preferably a support washer 48 is arranged at an outer surface 50 of the end portion 41 of the rotor damper 2 and fixed by the threaded bolt 46. The end portion includes a central hole 45 having a center axis that coincides with the length axis 32 of the main body 30.

The rotor damper 2 is provided with two slits 52 in the main body 30, which slits 52 extends in the direction of the length axis 32 of the main body 30. When the hub 12 is mounted on the drive shaft 6 and the pin 18 extends trough the second bore 20 in the hub 12 and trough a substantially diametrically arranged hole 22 in the drive shaft 6 the rotor damper 2 can be mounted in the first bore 16 of the hub 12 by pushing the rotor damper 2 in the axially direction of the drive shaft 6. The slits 52 in the main body 30 of the rotor damper 2 thus make it possible for the rotor damper 2 to slide into the intended position in the hub 12 and onto the end part 10 of the drive shaft 6. The slits 52 also make it possible to replace the rotor damper 2 with another rotor damper 2 having different damping characteristics. The rotor dampers 2 can be made in different materials such as rubber and plastics and also a mix of these materials in order to achieve different dampening characteristics. In the embodiment disclosed in FIG. 1 a sleeve 54 may be arranged onto the free end part 10 of the derive shaft 6. The rotor damper 2 is arranged over and onto the sleeve 54. Since the main body 30 of the rotor damper 2 is provided with slits 52 the drive shaft 6 and the inner walls of the first bore 16 in the hub 12 may come into contact with each others. The sleeve 54 will therefore prevent the drive shaft 6 and the hub 12 to come into contact and as a result protect the drive shaft 6 and the hub 12 from wear. The sleeve 54 is preferably made of a plastic material. The sleeve 54 is provided with a substantially diametrical arranged hole 56 to allow the pin 18 to pass through the sleeve 54 when mounted to the free end part 10 of the drive shaft 6.

Figure 2:
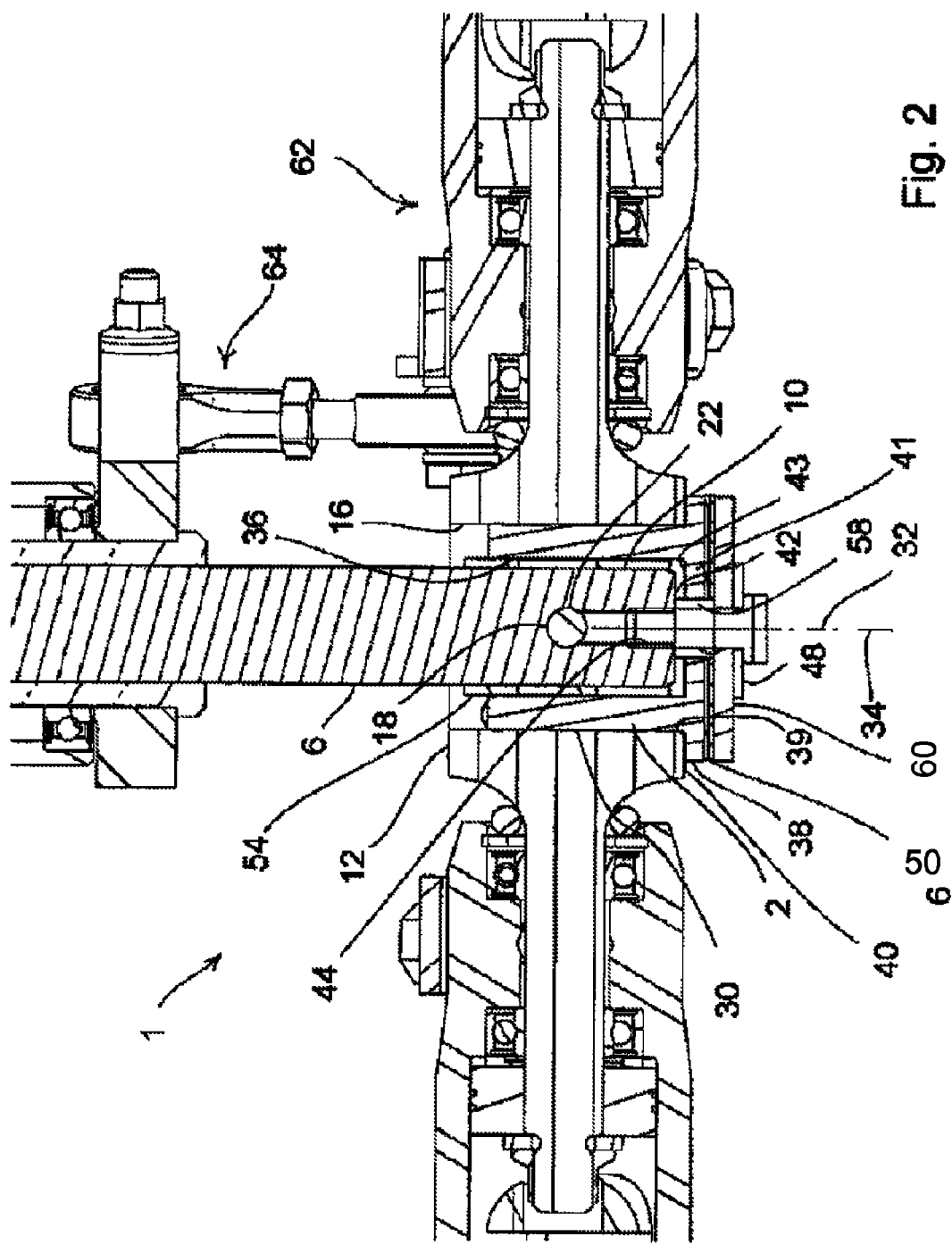
FIG. 2 shows a section view along the drive shaft of a tail rotor provided with a rotor damper according to the invention.

FIG. 2 shows a section view along the drive shaft 6 of the tail rotor 1 which is provided with a rotor damper 2 according to the invention. The rotor damper 2 is arranged in the space or gap between the drive shaft 6 and the hub 12 and fixed to the distal end 42 of the drive shaft 6 by means of the threaded bolt 46. A distance sleeve 58 is arranged on the threaded bolt 46 and the length of the distance sleeve 58 is adapted to the dimensions of the flange 38. Also, distance washers 60 are arranged on the outer surface 50 of the end portion 41. Preferably the distance washers 60 are interposed between the support washer 48 and the outer surface 50 of the end portion 41. In the disclosed embodiment of FIG. 2, two distance washers 60 are arranged on the outer surface 50 of the end portion 41. As an alternative or a complement to replace the rotor damper 2 in order to achieve the required dampening characteristics of the tail rotor 1 can be adjusted by adding or removing one or more distance washers 60. When adding a distance washer 60 the pressure from the threaded bolt 46 and the support washer 48 increases on the rotor damper 2 and the material of the rotor damper 2 will therefore be compressed. When the material of the rotor damper 2 is compressed the resiliency of the rotor damper 2 decreases and the dampening of the tail rotor 1 therefore also decreases. If a distance washer 60 is removed the pressure from the threaded bolt 46 and the support washer 48 decreases on the rotor damper 2 and the material of the rotor damper 2 will therefore be allowed to expand. When the material of the rotor damper 2 is allowed to expand the resiliency of the rotor damper 2 increases and the dampening of the tail rotor 1 therefore also increases. In FIG. 2 also the sleeve 54 arranged on the drive shaft 6 is disclosed. Also, the connection arrangement 62 of the rotor blades 14 to the hub 12 is disclosed. The pitch of the rotor blades 14 can be changed by a drive mechanism 64.

Figure 3:
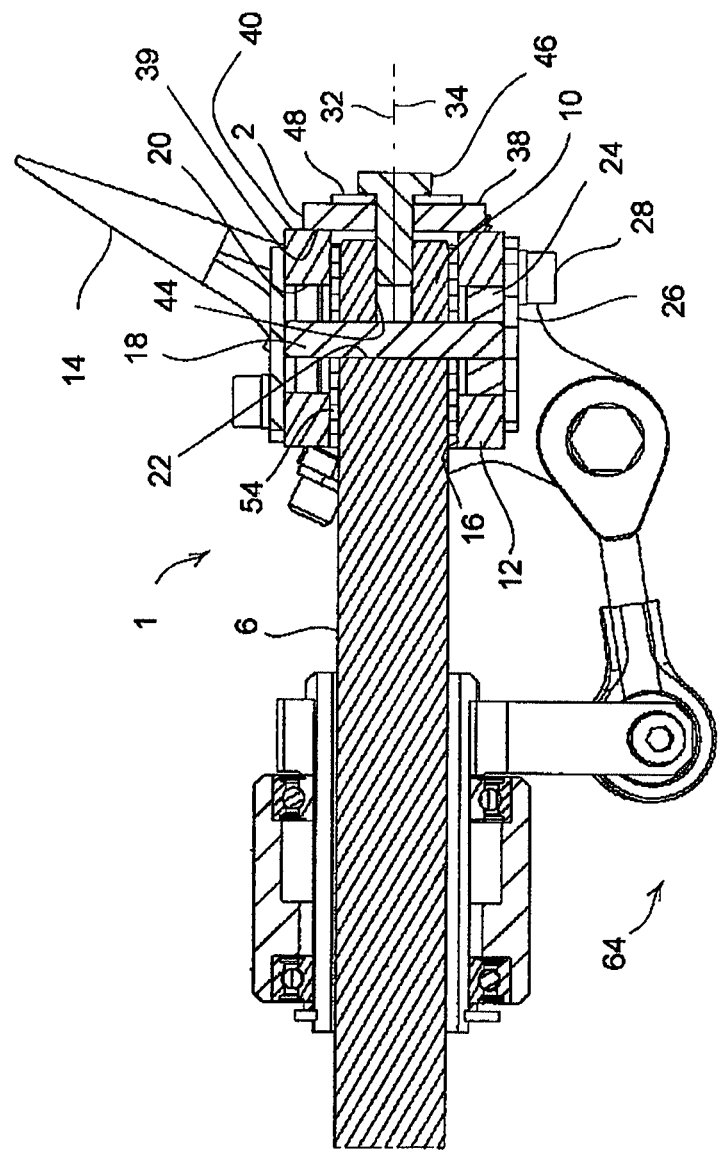
FIG. 3 shows a section view along the drive shaft of a tail rotor provided with a rotor damper according to the invention, in an angle of 90° comparing to FIG. 2.

FIG. 3 shows a section view along the drive shaft 6 of the tail rotor 1 provided with the rotor damper 2 according to the invention, in an angle of 90° comparing to FIG. 2. The pin 18 extends through the drive shaft 6 and the sleeve 54 and is pivotal arranged in the second bore 20 in the hub 12 via the bearings 24. As mentioned above, the pin 18 and the bearings 24 are locked in the axial direction of the pin 18 by means of lock plates 26 fixed by screws 28 into the hub 12. It is also evident from FIG. 3 that the sleeve 54 will prevent the drive shaft 6 and the hub 12 to come into contact and as a result protect the shaft 6 and the hub 12 from wear. In the embodiment disclosed in FIG. 3 no distance washers 60 are interposed between the outer surface 50 of the end portion 41 of the main body 30 and the support washer 48.

According to an embodiment of the invention the helicopter 4 is an unattended vehicle (UAV). Such unattended helicopters have smaller dimensions in relation to full size helicopters and therefore also the stresses on the components in the helicopter, such as the drive shafts, couplings, dampers and rotors, are smaller in a UAV in relation to a full size helicopter.

The invention claimed is:

1. A rotor damper for a tail rotor of a helicopter, the rotor damper comprising:
   a main body of a resilient material to be arranged between a drive shaft for the tail rotor and a hub on which rotor blades for the tail rotor are coupled, wherein the main body comprises an end portion comprising an abutment surface for abutting a distal end of the drive shaft of the tail rotor; and
   a flange connected to the main body of the rotor damper, the flange comprising an abutment surface for abutting an outer surface of the hub, wherein the abutment surface of the flange is substantially parallel to the abutment surface of the main body.

2. The rotor damper according to claim 1, wherein the main body of the rotor damper is elongated in a direction perpendicular to a length axis of the main body.

3. The rotor damper according to claim 1, wherein the flange is made of a same material as the main body of the rotor damper.

4. The rotor damper according to claim 1, wherein the abutment surfaces of the flange and the end portion have a common plane.

5. The rotor damper according to claim 1, wherein a central hole is arranged in the end portion, wherein the central hole has a center axis which coincides with a length axis of the main body.

6. The rotor damper according to claim 1, wherein two slits are arranged in the main body, wherein the slits extend in a direction of a length axis of the main body.

7. The rotor damper according to claim 1, wherein the material in the rotor damper is rubber, plastic or a combination of rubber and plastic.

8. A tail rotor for a helicopter, the tail rotor comprising:
   a drive shaft with a free end part;
   a hub on which comprising a first bore that extends through the entire hub, wherein the first bore is adapted to accommodate the free end part of the drive shaft;
   rotor blades coupled to the hub;
   a rotor damper arranged between the drive shaft for the tail rotor and the hub, the rotor damper comprising a main body of a resilient material and a flange connected to the main body, the flange comprising an abutment surface for abutting an outer surface of the hub, wherein the main body comprises an end portion comprising an abutment surface for abutting a distal end of the drive shaft of the tail rotor, and wherein the abutment surface of the flange is substantially parallel to the abutment surface of the main body.

9. The tail rotor according to claim 8, wherein the rotor damper is fixed to the drive shaft and in the first bore of the hub by a treaded bolt which is threaded into a threaded hole in a distal end of the free end part of the drive shaft.

10. The tail rotor according to claim 9, further comprising:
    a support washer arranged at an outer surface of an end portion of the rotor damper and fixed by the treaded bolt.

11. The tail rotor according to claim 10, further comprising:
    at least one distance washer arranged between the support washer and the outer surface of the end portion.

12. The tail rotor according to claim 8, further comprising:
    a pin connecting the hub to the drive shaft, wherein the pin extends through a second bore in the hub and through a substantially diametrically arranged hole in the drive shaft.

13. The tail rotor according to claim 12, wherein the pin passes through the slits in the main body of the rotor damper.

14. The tail rotor according to claim 8, wherein the helicopter is an unattended vehicle.

* * * * *